United States Patent Office 3,342,772
Patented Sept. 19, 1967

3,342,772
PREVENTION OF SCORCH IN CHLORINATED POLYMERS BY USE OF UNSATURATED HYDROCARBON ADDITIVES
Paul Thomas Parker, Baton Rouge, La., assignor to Esso Research and Engineering Company, a corporation of Delaware
No Drawing. Filed Sept. 10, 1964, Ser. No. 395,554
2 Claims. (Cl. 260—45.7)

This invention relates to the stabilization of rubbery polymeric compositions containing partially halogenated highly unsaturated copolymers of isoolefins and multiolefins with minor proportions of certain unsaturated compounds.

In accordance with the present invention it has now been found that, while isoolefin-multiolefin copolymers, such as butyl rubber, do not respond to stabilization by unsaturated compounds, certain halogenated derivatives of these copolymers are surprisingly improved by these stabilizing compounds as to decrease gelation during drying, milling and/or extruding steps.

Copolymers of the general type covered by the composition and process of the present invention comprise a major proportion (preferably about 85 to 99.5 wt. percent) of a $C_4$ to $C_6$ isoolefin such as isobutylene, 2-methyl butene-1, or 3-methyl butene-1, etc., with a minor proportion (preferably about 15 to 0.5 wt. percent) of a multiolefin of about 4 to 14, preferably about 4 to 6 carbon atoms. These are commonly referred to in patents and in technical literature as "butyl rubber" or GR–I rubber (Government Rubber-Isobutylene) for example in the text book "Synthetic Rubber" by G. S. Whitby. The preparation of butyl rubber is described in U.S. Patent No. 2,356,128 to Thomas et al. The multiolefinic component of the copolymer is preferably a conjugated diolefin such as isoprene, butadiene, dimethyl butadiene, piperylene, myrcene, or such multiolefins as cyclopentadiene, methylcyclopentadiene, cyclohexadiene, dimethallyl, allo-ocimene, vinyl fulvenes, etc. If desired, about 0.05 to 20.0, preferably about 0.2 to 5.0 parts by weight, based on total reacting comonomers, of unsaturated compounds as styrene, p-methyl styrene, alpha methyl styrene, divinyl benzene, indene, dihydronaphthalene, etc. or mixtures thereof may also be present. These copolymers have Staudinger molecular weights of between about 20,000 to 300,000 and mole percent unsaturations of between about 0.5 to 15.0.

The halogenated rubbery isoolefin-containing copolymers, particularly chlorinated or brominated butyl rubbers, are produced by carefully chlorinating and/or brominating the hydrocarbon copolymers in a manner which does not degrade the molecular weight. The resulting halogenated copolymers do not require sulfur or ultra-accelerators in their vulcanization and may be vulcanized solely by zinc oxide and/or primary or polyfunctional amines.

In order to produce halogenated butyl rubber, the halogenation is regulated so that the resulting rubber will contain at least about 0.5 wt. percent (preferably at least about 1.0 wt. percent) of combined halogen but not more than about "X" wt. percent of combined chlorine or 3.0 "X" wt. percent combined bromine wherein:

$$X = \frac{M_3 L}{(100-L)M_1 + L(M_2+M_3)} \times 100$$

and
$L$=mole percent of the multiolefin in polymer
$M_1$=molecular weight of the isoolefin
$M_2$=molecular weight of the multiolefin
$M_3$=atomic weight of chlorine or bromine.

Suitable halogenating agents which may be employed are gaseous chlorine, liquid bromine, alkali metal hypochlorites, or hypobromites, $C_4$ to $C_{10}$ tertiary alkyl hypochlorites, sulfur bromides, sulfuryl chloride, pyridinium chloride perchloride, N-bromosuccinimide alpha-chloroaceto-acetanilide, N,N - dichloro - 5,5 - dimethylhydantoin, iodine halides, trichlorophenol chloride, N-chloroacetamide, etc. The preferred halogenating agents are gaseous chlorine, liquid bromine, sulfuryl chloride, sulfuryl bromide, chlorohydantoins, bromohydantoins, iodine monochloride, and related materials.

The halogenation is generally conducted at temperatures of above about 0° to about 100° C., depending upon the particular halogenating agent, for about one minute to several hours. An advantageous pressure range is from about 0.1 to 1000 p.s.i.a., atmospheric pressure being satisfactory. The halogenation may be accomplished by preparing a 1 to 80 wt. percent solution of such copolymers as described above, in a substantially inert liquid organic solvent such as a $C_3$ to $C_{10}$ substantially inert hydrocarbon or halogenated derivatives of saturated hydrocarbons; e.g. hexane, mineral spirits, cyclohexane, benzene, chlorobenzene, chloroform, carbon tetrachloride, mixtures thereof, etc., and adding thereto the halogenating agent, which may optionally be in solution, such as dissolved in a substantially inert hydrocarbon, an alkyl chloride, carbon tetrachloride, carbon disulfide, etc.

If chlorine gas is employed, it may also be diluted with up to about 50 times its volume, preferably about 0.1 to 5.0 times its volume of a substantially inert gas such as nitrogen, methane, carbon dioxide, etc.

The resulting halogenated isoolefin-multiolefin-containing copolymer may be recovered by precipitation with oxygenated hydrocarbons, particularly alcohols or ketones such as acetone or any other known non-solvent for the halogenated butyl rubber and dried, preferably under about 1 to 760 millimeters or higher of mercury pressure absolute, at about 0° to 180° C., preferably about 50° to 150° C. (e.g. 70° C.). Other methods of recovering the chlorinated polymer are by conventional spray or drum drying techniques. Alternatively, the solution of the halogenated rubber may be injected into a vessel containing steam and/or agitated water heated to a temperature sufficient to volatilize the solvent and form an aqueous slurry of the chlorinated rubber. This halogenated rubber may then be separated from the slurry by filtration and drying or recovered as a "crumb" or as a dense sheet or slab by conventional hot milling and/or extruding procedures. As so produced, the halogenated rubbery copolymer has a Staudinger molecular weight within the range between approximately 20,000 to 300,000, preferably about 25,000 to 200,000, and a mole percent unsaturation of about 0.5 to 15.0, and a combined halogen content of about 0.5 to 10.0 weight percent, preferably about 1.0 to 5.0 weight percent based on rubbery copolymer.

It has been found that halogenated polymers of the type described above and containing more than 0.5 wt. percent chlorine and having more than 1.0 mole percent unsaturation self cure on the mill when heated in the absence of curing agents to temperatures above 200° F. This is indicated by a large increase in gel content and is measured on a standard Mooney machine at 260° F. as the number of minutes required for a 5 point rise in Mooney points. This is known as the gum Mooney scorch time.

In accordance with the present invention this tendency for these halogenated polymers to self-cure is overcome by adding 0.1 to 10 wt. percent of certain unsaturated compounds including methyl cyclopentadiene, dimethylfulvene and isoprene.

In practicing the present invention, the unvulcanized halogenated isoolefin-multiolefin-containing copolymer is blended at a temperature between 0° and 200° C. with about 0.1 to 10 wt. percent based on copolymer of the unsaturated compound and then thoroughly mixed in a blending machine, such as a mill, at temperatures above 200° C.

In order to more fully illustrate the present invention the following experimental data are given.

Example 1

A copolymer prepared from a feed consisting of about 99 wt. percent of isobutylene and 1.0 wt. percent methyl cyclopentadiene and having a 3 minute Mooney at 260° F. of 62 and an unsaturation of 1.8 mole percent was dissolved in hexane to form a 12 wt. percent solution. This solution was chlorinated by conducting gaseous chlorine at a dosage of 4.0 wt. percent through the cement over a period of ten minutes at 30° C. in a Pfaudler reactor equipped with agitator and baffle. The chlorine was added to the reactor through a ⅜ inch stainless steel tube, one end of which was immersed below the liquid level of the agitated cement. The resulting solution of chlorinated polymer was then water-washed to remove dissolved hydrogen chloride. The polymer was precipitated with acetone and stabilized with 1.82 wt. percent calcium stearate and 0.2 wt. percent 2,6-ditertiary-4-methyl phenol. It was mill dried at 220° F. in the presence of 1 wt. percent dimethylfulvene, based on polymer The following data were obtained:

| Reactant | None | Dimethyl fulvene |
|---|---|---|
| Mill Dried Product | Cured | OK |
| Mooney, 3 min. at 260° F | | 3.24 |
| Unsaturation, mole percent | 1.76 | 3.00 |
| Gel, weight percent | 28.6 | 0.80 |
| Chlorine, weight percent | 0.60 | |

The above data show that the treatment of the polymer on the mill with dimethylfulvene prevents the scorching of the raw rubber on the mill with no essential loss of chlorine. In contrast the untreated polymer cured on the mill during the drying step.

Example 2

A chlorinated copolymer was prepared as described in Example 1, but this time from a feed consisting of 1.5 wt. percent of methyl cyclopentadiene, 0.2 wt. percent of divinyl benzene and 98.3 wt. percent of isobutylene. The chlorine dosage was 3.5 wt percent and the unchlorinated polymer had a mole percent unsaturation of 3.5 and a three minute Mooney at 260° F. of 60. To the polymer solution was added 4.5 wt. percent of methylcyclopentadiene and the mixture heated for two hours at 150° F. The following results were obtained:

Treating agent— MCPD
Mill dried product (240° F.):
  Unsat. (mole percent) — 4.0
  Gel (wt. percent) — 0.0
  Chlorine (wt. percent) — 0.90
  Appearance — OK
Mooney, 3 min. at 260° F — 33
Gum Mooney scorch at 260° F — 19
Cure data:
  Type cure — ZnO
  Time at 307° F — 20
  Mooney scorch — 10.3
  Tensile, p.s.i — 1150
  Modulus, 300% p.s.i — 680
  Elongation, percent — 450
Recipe:
  Polymer — 100
  SRF Black — 50
  Stearic acid — 1
  ZnO — 5

Example 3

A copolymer was prepared from a feed containing 0.9 wt. percent of methylcyclopentadiene and 99.1 wt. percent isobutylene and chlorinated at a chlorine dosage of 4.0 wt. percent and was worked up as in Example 1. The resulting polymer was worked up on the mill in the presence of various stabilizing agents. The following data were obtained.

| Treatment: | | | | | |
|---|---|---|---|---|---|
| Reactant [1] | None | DMF | DMF | MCPD | Isoprene |
| Wt. percent on polymer | | 1 | 1.75 | 4.35 | 4.35 |
| How treated | | A | B | B | B |
| Mill Dried Product | Cured | OK | OK | OK | OK |
| Mooney, 3 min. at 260° F | 60 | 46 | 45 | 42 | 51 |
| Unsats., mole percent | | 4.7 | 3.8 | 3.78 | 1.59 |
| Gel, wt. percent | 11.6 | 0.0 | 0.0 | 0.0 | 0.0 |
| Cl$_2$, wt. percent | 0.74 | 0.66 | 0.83 | 0.71 | 0.79 |
| Mooney Scorch (gum) 260° F | | | 20+ | 20+ | 12 |

[1] DMF—dimethyl fulvene; MCPD—methylcyclopentadiene. A—Reagents added to polymer on cold mill. B—Reagents added to chlorinated cement and allowed to stand 24 hours at room temperature in the dark.

The above data show that dimethylfulvene, methylcyclopentadiene, and isoprene are effective in preventing self curing of the chlorinated polymer on the mill.

The advantages of the present invention having thus been fully set forth and specific examples of the same given, what is claimed as new and useful and desired to be secured by Letters Patent is:

1. A composition of matter comprising (1) a rubbery polymer selected from the group consisting of (A) halogenated butyl rubber of a major proportion of a $C_4$ to $C_6$ isoolefin with a minor proportion of a $C_4$ to $C_{14}$ multiolefin and (B) a halogenated copolymer of 85 to 99.5 wt. percent of a $C_4$ to $C_6$ isoolefin, 15 to 0.5 wt. percent of a multiolefin and 0.2 to 5.0 wt. percent of an unsaturated compound chosen from the group consisting of styrene, p-methyl styrene, alpha methyl styrene, divinyl benzene, indene, dihydronaphthalene, and mixtures thereof, said halogenated butyl rubber and halogenated copolymer each having a halogen content of at least 0.5 wt. percent and a mole percent unsaturation of at least 1.0 and (2) 0.1 to 10 wt. percent, based on polymer of dimethyl fulvene.

2. A composition of matter comprising (1) a rubbery polymer selected from the group consisting of (A) halogenated butyl rubber of a major proportion of a $C_4$ to $C_6$ isoolefin with a minor proportion of a $C_4$ to $C_{14}$ multiolefin and (B) a halogenated copolymer of 85 to 99.5 wt. percent of a $C_4$ to $C_6$ isoolefin, 15 to 0.5 wt. percent of a multiolefin and 0.2 to 5.0 wt. percent of an unsaturated compound chosen from the group consisting of styrene, p-methyl styrene, alpha methyl styrene, divinyl benzene, indene, dihydronaphthalene, and mixtures thereof, said halogenated butyl rubber and halogenated copolymer each having a halogen content of at least 0.5 wt. percent and a mole percent unsaturation of at least 1.0 and (2) 0.1 to 10 wt. percent, based on polymer of isoprene.

References Cited

UNITED STATES PATENTS

| | | | |
|---|---|---|---|
| 2,681,899 | 6/1954 | Crawford et al. | 260—45.7 |
| 2,981,714 | 4/1961 | Small et al. | 260—45.7 |

FOREIGN PATENTS

| | | |
|---|---|---|
| 1,149,166 | 5/1963 | Germany. |

DONALD E. CZAJA, *Primary Examiner.*

LEON J. BERCOVITZ, *Examiner.*

M. J. WELSH, *Assistant Examiner.*